Patented Jan. 4, 1938

2,104,477

UNITED STATES PATENT OFFICE 2,104,477

CONCRETE COMPOSITION

John Draugelis, Girardville, Pa.

No Drawing. Application December 4, 1936,
Serial No. 114,134

1 Claim. (Cl. 106—24)

This invention relates to improvements in concrete mixtures and more particularly to such types as are adapted to be formed into plates, slabs and other regular shapes to be used as building material.

One of the objects of this invention is to provide a plastic mixture having the property of marked cohesion and resultant strength when curved and subjected to strain.

Another feature is in the provision of concrete slabs of unusual porosity, fireproof and capable of acting efficiently as a non-conductor of heat.

A further purpose is to produce a concrete mixture of low cost suited to be molded into any given desired shape and maintain the same indefinitely.

These several advantageous objects are accomplished by a novel mixture of vegetable fibrous material, a powdered filler, such as anthracite ash, and a mineral cementing material such as Portland cement.

In preparing the composition the ingredients are used in exactly the following proportions:

Seventeen percent ground corn stalks, thirty-three percent anthracite coal ashes, white and sifted free from clinkers, etc., and fifty percent Portland cement.

All the ingredients are by measured quantities in a dry condition, intimately mixed and sufficient water supplied to constitute a plastic, homogenous mass suitable for pouring into molds, there to remain until air cured and sufficiently dry to retain the shape imparted by the mold.

The composition is light in weight, is fireproof, and an efficient non-conductor of heat.

Having thus disclosed the invention and set forth the ingredients in their exact proportions as developed by exhaustive experiments, what is claimed as new and sought to secure by Letters Patent is:—

A plastic composition adapted to be formed into miscellaneous shapes, comprising 17% ground corn stalk, 33% anthracite coal ash, and 50% Portland cement, said elements intimately mixed in exactly the foregoing proportions with water to form a plastic mass.

JOHN DRAUGELIS.